United States Patent [19]
Genin

[11] 3,888,023
[45] June 10, 1975

[54] PHYSICAL TRAINING ROBOT

[75] Inventor: Robert Genin, Bay Harbor Islands, Fla.

[73] Assignee: Jardine Industries, Inc., Hong Kong

[22] Filed: Aug. 21, 1974

[21] Appl. No.: 499,194

[52] U.S. Cl.................... 35/29 R; 40/106.3; 46/120
[51] Int. Cl...................... G09b 19/00; A63h 11/00
[58] Field of Search.......... 35/21, 29 R, 29 A, 29 B, 35/29 C, 29 D, 29 E, 17; 272/57 R, 76; 40/106.3, 106.34; 46/119, 120, 143, 147, 148

[56] References Cited
UNITED STATES PATENTS

| | | | |
|---|---|---|---|
| 1,685,358 | 9/1928 | Harcourt...................... | 40/106.3 X |
| 1,836,203 | 12/1931 | Thompson..................... | 40/106.3 |
| 2,615,282 | 10/1952 | Ueltschi........................ | 40/106.34 |
| 2,637,936 | 5/1953 | Dale............................... | 40/106.3 |
| 3,473,239 | 10/1969 | Noseworthy................. | 35/21 |
| 3,758,982 | 10/1972 | Lemelson..................... | 46/119 |

*Primary Examiner*—Harland S. Skogquist

[57] ABSTRACT

A physical training robot instructor programmed to selectively demonstrate any one of a series of calisthenic exercises. The robot is in humanoid form and includes a pair of articulated hand and arm assemblies pivotally attached to the shoulders of a torso element, the assemblies being manually adjustable whereby the hands and arms may be caused to assume any desired posture relative to the body of the robot. The torso element is rockably mounted above a pelvis element and is rotatable with respect thereto, which pelvis element is trunnioned on a pair of legs whereby the robot is capable of carrying out separate side rocking, twisting and bowing movements or concurrent bowing and twisting movements. These movements are governed by a motorized cam mechanism having a series of distinct program tracks and a selector for bringing the torso and pelvis elements into operative engagement with a desired set of tracks to cause the robot to cyclically demonstrate a particular exercise.

9 Claims, 16 Drawing Figures

PROGRAM I SIDE BEND (ROCKING)
PROGRAM II FRONT BEND (BOWING)
PROGRAM III TWIST (OSCILLATING)
PROGRAM IV FRONT BEND & TWIST (VECTOR)

PHYSICAL TRAINING ROBOT

BACKGROUND OF THE INVENTION

This invention relates generally to automated manikins, and more particularly to a robot having a humanoid appearance and programmed to operate as a physical training instructor for demonstrating any one of a series of body-building exercises.

The ancient Greeks sought to develop citizens both physically and mentally, and thus accorded calisthenics an important educational role. Calisthenics involves systematic bodily exercises without apparatus or with light apparatus such as dumbells. The value of formal physical exercises and the benefits derived from the daily practice of calisthenics is widely recognized, but the fact remains that most children and adults fail to participate regularly in such exercises.

The usual practice both in schools and in the military is to employ a physical training (PT) instructor to act as a demonstrator who, by example, guides students in a series of body movements involving bending, rocking, twisting and other actions.

Thus for any given exercise, the procedure is for the PT instructor to first place his arms and hands in a posture appropriate to the exercise. For instance, the instructor may raise his arms above his head with the hands facing each other, or he may stretch his arms outwardly with the hands, palms down, or he may assume an akimbo position. Then, depending on the particular exercise to be followed, the instructor proceeds to bend repeatedly up and down from the hips or to remain erect and twist alternately to the right and left, or to otherwise move his body to execute various types of twisting, rocking or bending movements and combinations thereof.

The students who observe the physical training instructor, assume the same arm and hand posture and then move their bodies in synchronism with the instructor. Hence the instructor functions as a demonstrator whose movements are imitated by the students.

The practical difficulty facing one who wishes to perform calisthenics with some regularity is that a PT instructor is available only for prescribed periods in a school, gymnasium, health club or other facility. When the schedule of a child or adult precludes attendance at a gymnasium or where the child or adult prefers to train at home, then the absence of an instructor is a serious handicap. It is for this reason that televised physical training programs are popular. However, in this instance, the participant must place himself before a T-V screen and observe and imitate the movements of the instructor. The limitations of this procedure are obvious, for the student must confine his exercises to the T-V room and can only exercise when the program is broadcast, which is usually in the early hours of the morning.

There is a real need therefore for a physical training instructor who is available on command at all times, and who functions at any indoor or outdoor location convenient to the student.

SUMMARY OF THE INVENTION

In view of the foregoing, it is the main object of this invention to provide a physical training robot instructor adapted to selectively demonstrate any one of a series of body-building exercises.

More particularly, it is an object of this invention to provide a PT robot of the above-type which includes an articulated hand and arm assembly that is manually adjustable by the student to assume any traditional calisthenics posture whereby the body movements thereafter automatically executed by the robot incorporate the pre-established hand and arm posture.

Also an object of this invention is to provide a PT robot whose motorized cam mechanism includes tracks defining several distinctly-different calisthenic programs, and a selector by which the student may choose any one of these programs.

Still another object of the invention is to provide a PT robot of simple, inexpensive design, the robot operating efficiently and reliably for as long as is required by the student.

Briefly stated, in a physical training robot in accordance with the invention, the robot which has a humanoid form includes left and right articulated hand and arm assemblies pivotally attached to the shoulders of a torso element, the assemblies being manually adjustable whereby the hands and arms of the robot may be manipulated to assume any desired exercise posture.

The torso element is rockably mounted on a pelvis element and is rotatable with respect thereto. The pelvis element is trunnioned on a pair of legs whereby the robot is capable of carrying out separate bowing, rocking and twisting movements or a concurrent combination of at least two of these movements. Thus the robot may have its hand and arm assemblies adjusted so that the arms are outstretched with the hands palms-down, the robot in this posture then being selectively operated to bow repeatedly, to rock from side to side, to twist back and forth or to carry out simultaneous bowing and twisting movements.

These movements are governed by a motorized cam mechanism which is external to the robot and is linked to said elements by a rack and gear assembly, the cam mechanism having a series of distinct cam tracks and a selector for bringing cam followers associated with the torso and pelvis elements into operative engagement with a desired set of tracks to cause the robot to cyclically demonstrate a particular exercise.

OUTLINE OF THE DRAWING

For a better understanding of the invention as well as other objects and further features thereof, reference is made to the following detailed description to be read in conjunction with the accompanying drawing, wherein:

FIG. 3 is a longitudinal section taken through the robot instructor in a plane parallel to the side of the robot;

FIG. 9 is a flat layout of the cam surface; and

DESCRIPTION OF THE INVENTION

Figure 1:
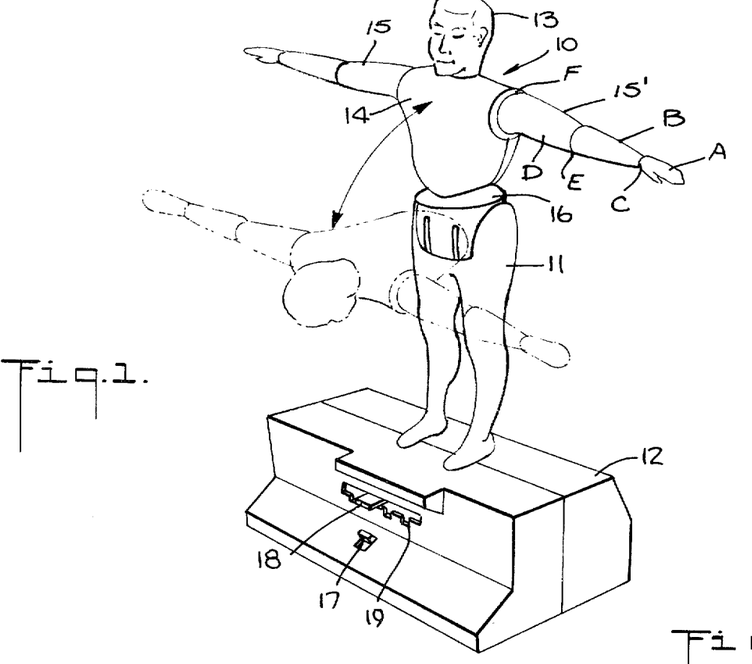
FIG. 1 is a perspective view of a preferred embodiment of a physical training robot instructor in accordance with the invention.

The Programmed Robot:

Referring now to FIG. 1 of the drawing, there is shown a PT robot instructor in accordance with the invention, the robot having a humanoid form and being generally designated by numeral 10. The robot includes a pair of hollow legs 11 whose feet are anchored on the top wall of a pedestal 12 housing the motorized cam mechanism for operating the robot.

Robot 10 is provided with a head piece 13 whose neck is attached to a torso element 14. Pivotally attached to the shoulders of the torso element are left and right, articulated hand and arm assemblies 15 and 15'. Each of these assemblies is constituted by a hand A, swiveled on a forearm B, the junction therebetween defining a wrist C. Forearm B is pivotally connected to an arm D to define an elbow E, and arm D is pivotally joined to the shoulder of torso 14 to define shoulder joint F.

Torso element 14 is rockably mounted above a pelvis element 16 and is rotatable with respect thereto whereby the torso may be bent or rocked from side to side relative to the pelvis or oscillated back and forth with respect thereto to produce a twisting motion. Pelvis element 16 is trunnioned on legs 11 whereby the pelvis and the body components supported thereby may bend forwardly from an erect position to produce a bowing motion.

The robot is operatively linked to a motorized cam mechanism housed within pedestal 12, which mechanism is battery-operated and controlled by a switch 17 on the front wall of the pedestal. The cam mechanism is provided with a cam cylinder having a series of endless cam tracks thereon each producing a distinct program of calisthenic movements, the program being repeated with each full revolution of the cylinder. Selection of a particular program is effected by a selector 18 which extends from a carrier supporting the cam cylinder and which is manually shiftable with respect to a row of track-positioning notches 19 formed in an opening in the front wall of the pedestal whereby the linkages associated with the movable elements of the robots may be brought into engagement with a desired set of cam tracks.

In the embodiment disclosed herein, the robot is programmed to provide any one of four calisthenic programs I, II, III and IV. In program I, the torso of the robot is caused repeatedly to bend or rock from side to side relative to the pelvis, this being referred to as the side bend program. In program II, the trunnioned pelvis of the robot is caused repeatedly to bend forwardly, thereby executing a bowing motion, this being referred to as the front bend program. In program III, the torso is caused to oscillate back and forth relative to the pelvis to execute what appears to be a twisting motion of the body, this program being referred to as the twist program.

In program IV, the programs II and III take place at the same time so that as the torso twists with respect to the pelvis, the pelvis concurrently bows. Because the resultant movement is the vector of the concurrent twisting and front bending actions, this program is referred to as the vector program.

In all of the above-described programs, the anchored legs 11 remain stiff, for in the embodiment disclosed herein, the legs are not articulated and no means are provided to manipulate the leg positions. However, it will be appreciated that in practice, the principles underlying the invention are applicable to programmed leg movements and also in a still more sophisticated embodiment, to head movements as well. It is also feasible to incorporate in the pedestal a group of endless magnetic tape recordings on a common cylinder, one each program. The movement of the tape past a pick-up head is synchronized with the cam mechanism, so that when a given calisthenic program is in progress, the output loud speaker of the playback system emits aural instructions related to this exercise program.

Figure 10:
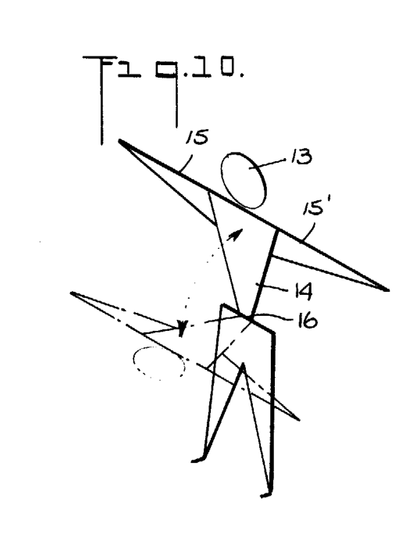
FIGS. 10 to 16 schematically illustrate a variety of calisthenic movements demonstrated by the robot instructor.

Because the articulated left and right hand and arm assemblies are manually adjustable, the PT robot may be set by the user to assume any desired calisthenic posture including those illustrated in FIGS. 10, 11, 12 and 13. FIG. 10 shows the assemblies in a posture in which the arms are outstretched, and with the robot operating in program II, so that the robot is caused to bow while the arms are outstretched. Hand positions are not shown in FIGS. 10 to 16, but it will be appreciated that the hands may be swiveled to assume any desired orientation relative to the arms.

Figure 11:
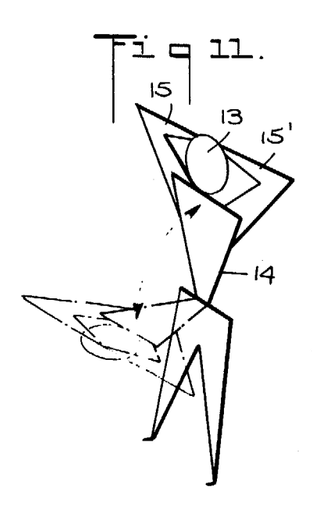
Figure 12:
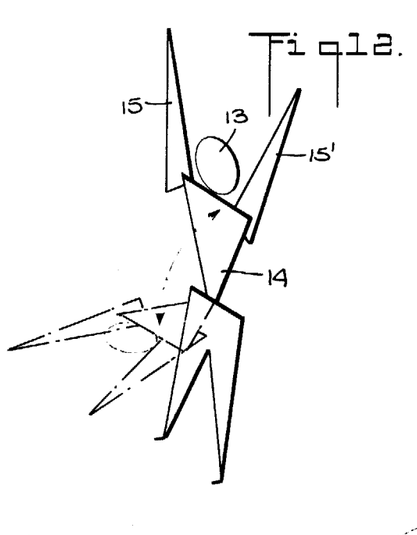
Figure 13:
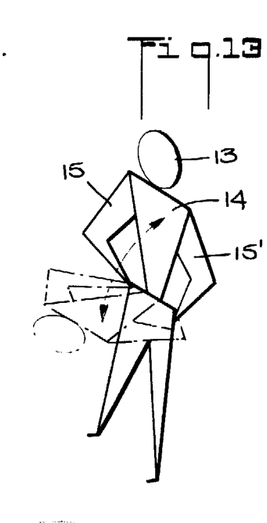

In FIG. 11, the hands are placed on top of the head piece with the arms bent at the elbows, the robot still operating in program II. The same calisthenics program is carried out in FIG. 12 and 13, but in the case of FIG. 12, the arms are stretched above the head while in FIG. 13 the arms are akimbo. Though FIGS. 10 to 13 illustrate some of the adjusted arm postures possible with any of the programs, it will be recognized that the hand and arm assemblies are capable of assuming other postures, such as one in which the arms are forwardly extended.

Figure 14:
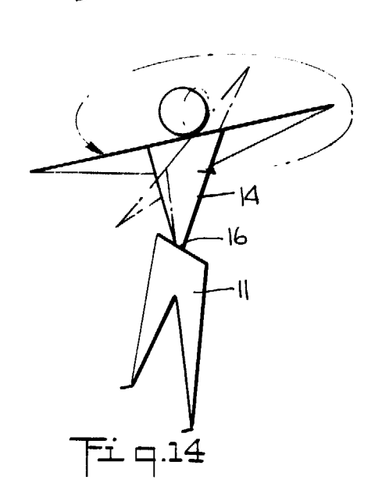

Referring now to FIG. 14, the robot movement shown is that of program III in which the torso oscillates back and forth with the body erect to execute a twisting motion. The arms here are shown outstretched.

Figure 15:
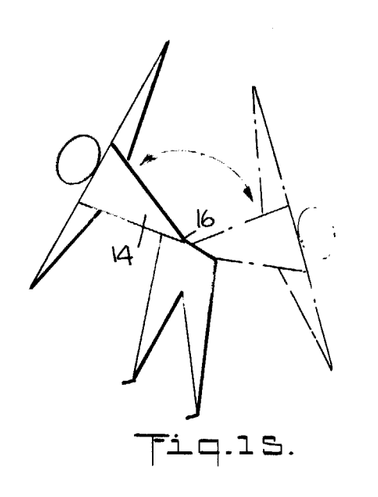
Figure 16:
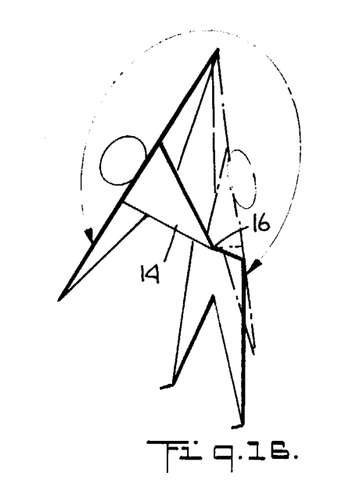

FIG. 15 schematically illustrates the robot carrying out program I, for now the robot bends from side to side to execute a rocking motion. Since the arms are outstretched, the arms alternately dip toward the right foot and the left foot. In FIG. 16 which illustrates program IV, the torso is concurrently twisting and bowing, so that the outstretched arms turn as they dip, this being the vector program.

Figure 2:
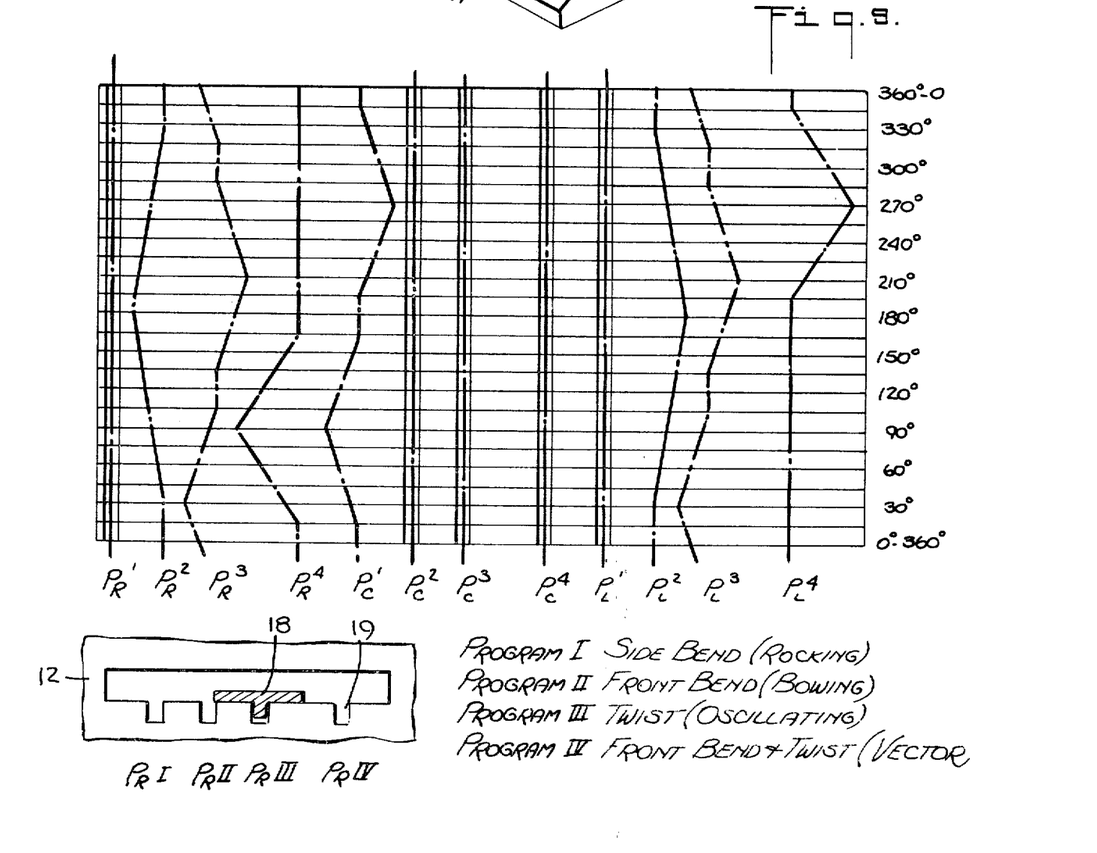
FIG. 2 is a longitudinal section taken through the robot instructor in a plane parallel to the front of the robot.
Figure 4:
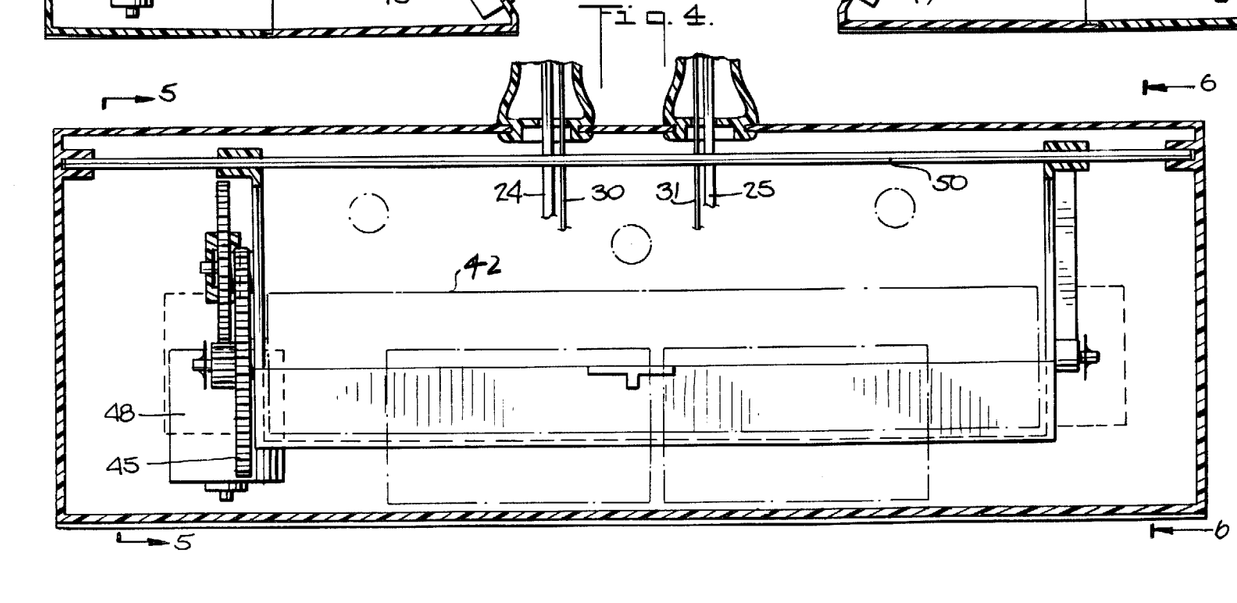
FIG. 4 is a longitudinal section taken through the pedestal of the instructor which houses the cam mechanism for operating the robot.
Figure 5:
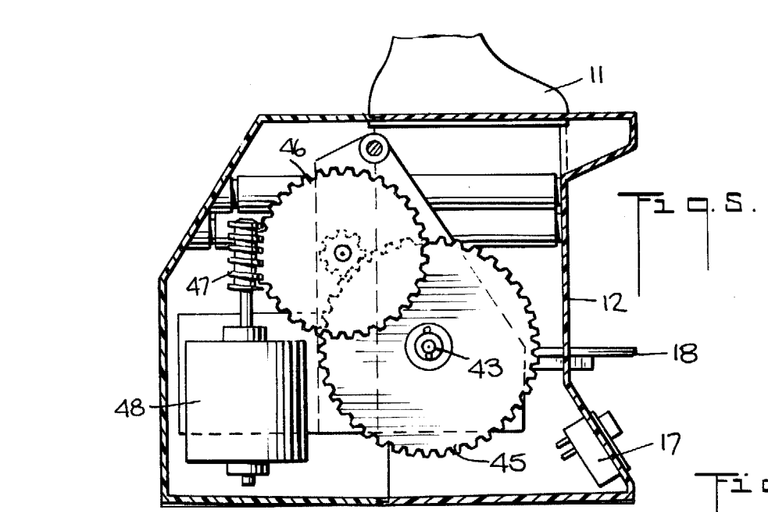
FIG. 5 is a transverse section taken through the pedestal in the plane indicated by line 5—5 in FIG. 4.
Figure 6:
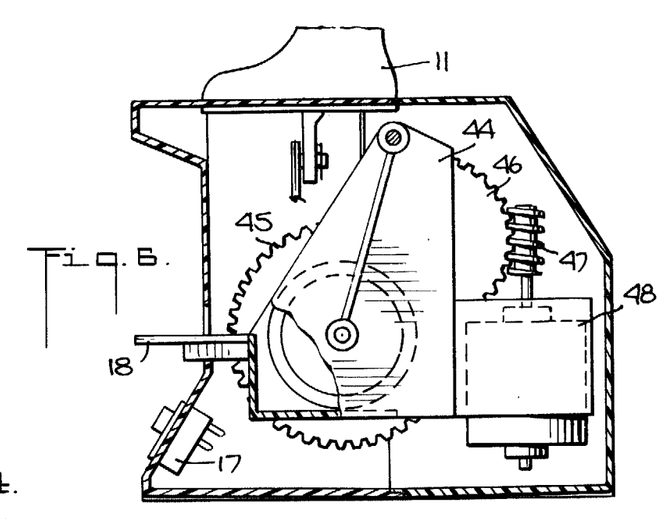
FIG. 6 is a transverse section taken through the pedestal in the plane indicated by line 6—6 in FIG. 4.
Figure 7:
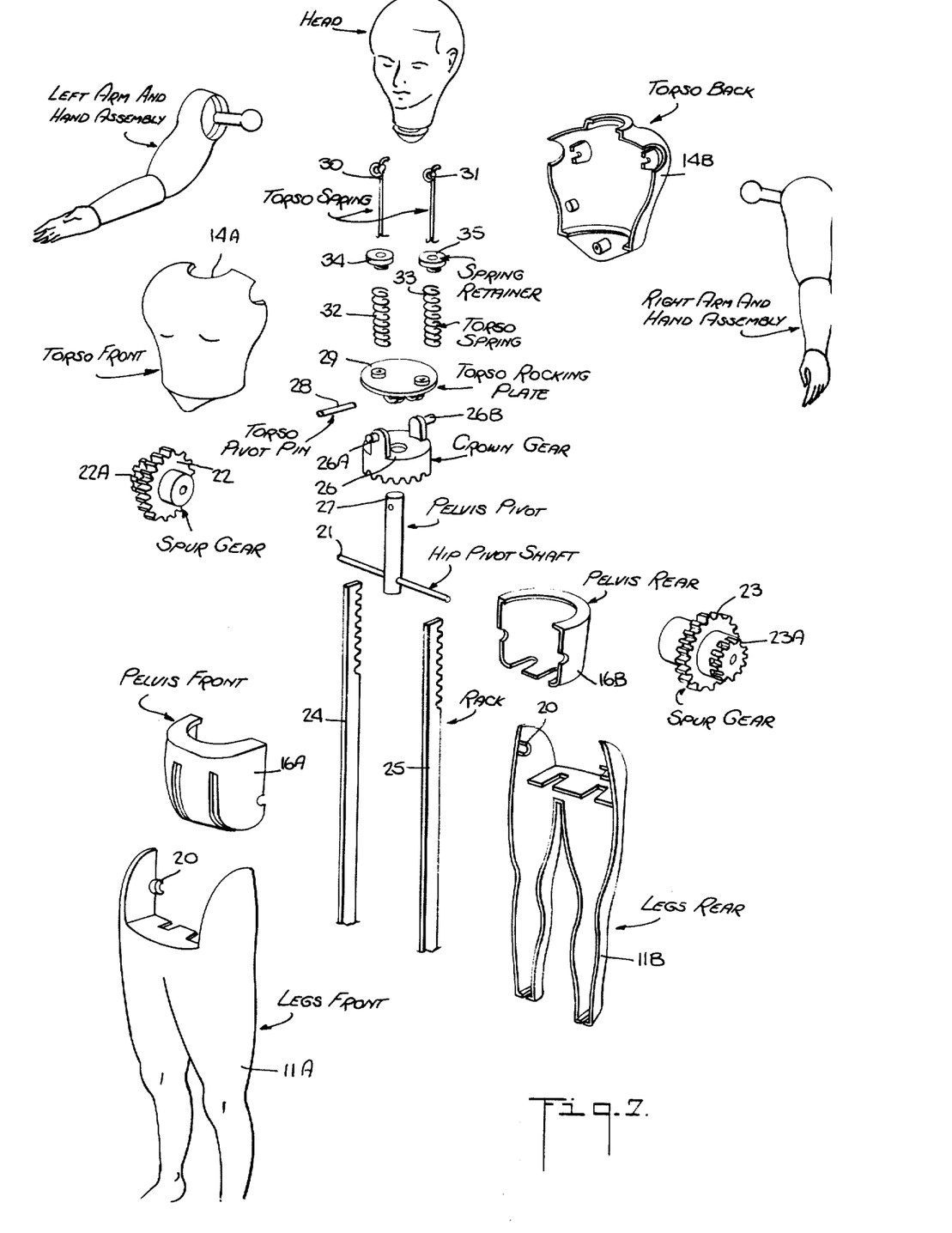
FIG. 7 is an exploded view showing the components of the robot.

The Internal Robot Mechanism:

Referring now to FIGS. 2, 3 and 7 illustrating the mechanism contained within the elements of robot 10, it will be seen that the hollow legs and haunches 11 are composed of front and rear sections 11A and 11B which are joined together, the haunches having a pair of trunnions 20 to receive the ends of a hip pivot shaft 21. Pelvis element 16 which is mounted on shaft 21 so that it is swingable on the legs, is composed of front and rear sections 16A and 16B which are joined together.

Mounted on the opposite ends of hip pivot shaft 21 are a pair of identical spur gears 22 and 23 which, as best seen in FIG. 2, are nested within pelvis 16, the spur gears having respective pinions 22A and 23A. Pinion 22A is engaged by a rack 24 which extends vertically down through one of the legs 11 into the pedestal, while pinion 23A is similarly engaged by a rack 25 which vertically extends down through the other leg into the pedestal.

Spur gears 22 and 23 intermesh with an overhead crown gear 26. The crown gear is supported for rotation on a plevis pivot bar 27, the hip pivot shaft 21 being supported at the lower end of the bar. Pivotally attached to the upper end of bar 27 by means of a pin 28 is a torso rocking plate 29 which is received in the torso element. Crown gear 26 is provided at its upper end with pivot pins 26A and 26B received in sockets 14p and 14p' in the two halves of the torso element 14.

Plate 29 received in the base of torso element 14 is rocked by means of a pair of strings 30 and 31 which are resiliently coupled to the plate at diametrically-opposed positions thereon by means of helical springs 32 and 33. The knotted upper ends of the strings engage the upper ends of the springs by means of spring retainers 34 and 35. Thus when string 30 is pulled, the torso rocks to the left side and when string 31 is pulled it rocks to the right side.

Figure 8:
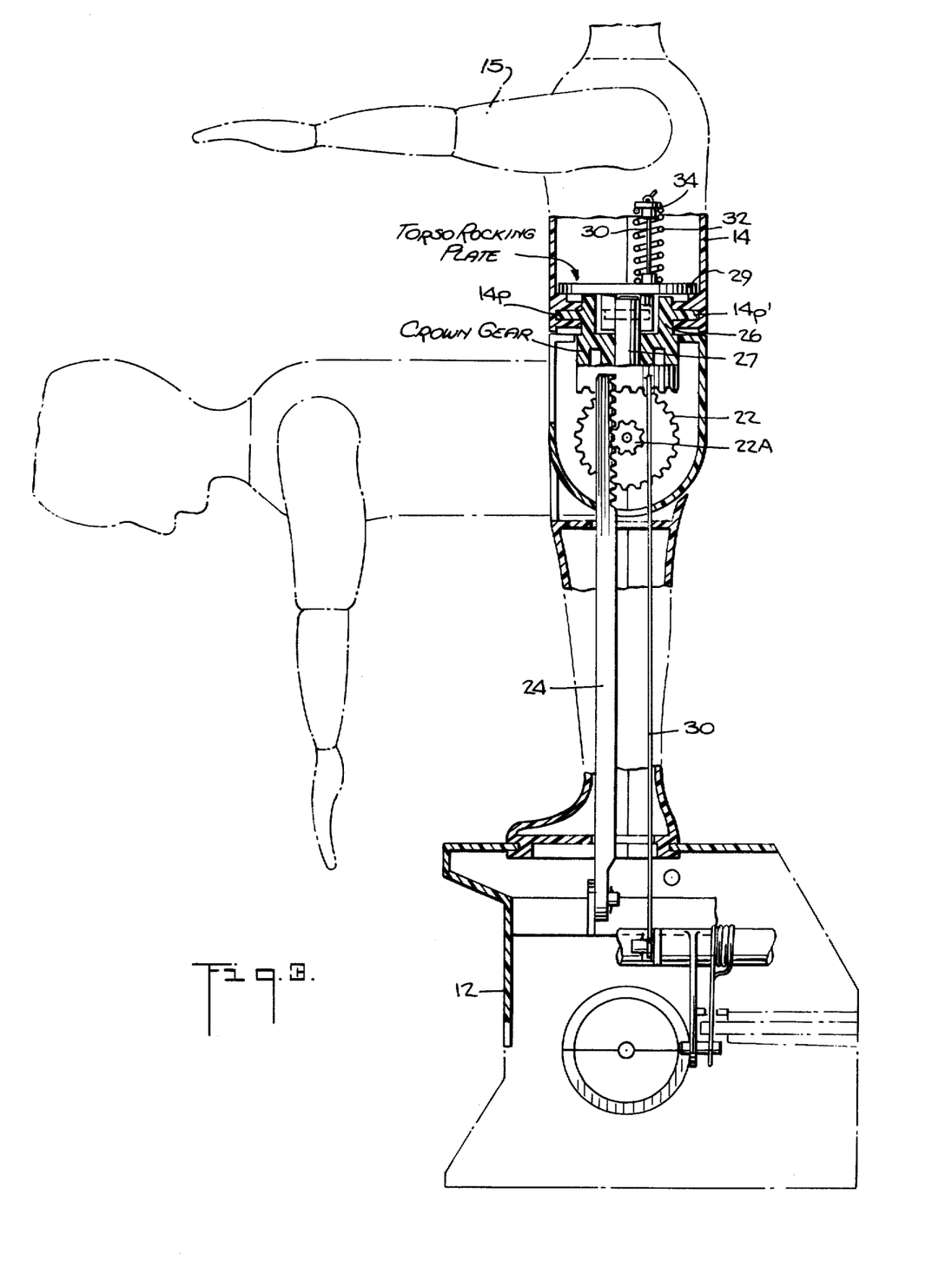
FIG. 8 is an exploded view showing the components of the cam mechanism housed in the pedestal and associated with the robot.

It will be seen in FIGS. 2 and 8, that the lower end of rack 24 is provided with a lateral connecting pin 24A which is joined by a retainer nut 24B to the link arm 36A of a left rocker linkage 36 having a follower arm 36B which as will later be explained, cooperates with a selected track on a cam mechanism so as to cause the rack to move up and down in accordance with the program track configuration. Thus if the engaged cam track is straight, the rack associated therewith will remain unmoved, but if the track has a sinuous or zig-zag path, the rocker, in following the non-linear path, will cause the associated rack to undergo corresponding up and down movements.

Similarly the lower end of rack 25 is provided with a connecting pin 25A which is joined by retainer nut 25B to the link arm 37A of a right rocker linkage 37 having a follower arm 37B engaging a program track. Thus the up and down movement of rack 25 is controlled by right rocker linkage 37 in accordance with a selected track formation associated with this linkage.

If therefore both racks move in the same up or down direction at the same rate, spur gears 22 and 23 driven by these racks will both turn clockwise (or counterclockwise) and at the same rate, and since these gears intermesh with crown gear 26 at diametrically-opposed positions, no torque will be applied to the crown gear. The concurrent rotation of the spur gears in the same direction will therefore cause the pelvis element 16 which is pivoted by hip pivot shaft 21 on the legs 11 to bend or bow in a direction determined by the direction of gear movement. If the spur gears are both turning counterclockwise, the pelvis element will bow forwardly, and if they are reversed in direction, the pelvis element will bend back to its initial erect position.

The spur gears in combination with the crown gear provide a differential mechanism so that when the spur gears 22 and 23 are caused to turn in opposite directions because rack 24 is going up while rack 25 is going down or vice versa, crown gear 26 will have a torque applied thereto. The resultant rotation of the crown gear causes torso 14 to turn in the same direction. Hence by tracking the racks so that they go in opposite directions, one can bring about a twisting action of the erect torso.

Strings 30 and 31 resiliently coupled to opposite points on rocker plate 29 are connected (see FIGS. 2 and 8) to opposing ends of the crank arm 38A of a center rocker linkage 38 whose cam arm 38B engages a selected track on the cam mechanism. With a straight cam track, the crank arm remains in its horizontal position, but with a zig-zag track, the arm is caused to rock about its pivot point, causing one string to go down and the other to go up, as a consequence of which the torso element is rocked from side to side with respect to the pelvis.

Associated with left-rocker linkage 36, center-rocker linkage 38 and right-rocker linkage 37 are hair-pin springs 39, 40 and 41, respectively, which serve to normally maintain these linkages in a neutral position. Hence, assuming that all three cam tracks engaged by these linkages are straight, the robot controlled thereby will remain perfectly erect, and no movement thereof will occur.

The Cam Mechanism:

As best seen in FIGS. 2 to 6 and 8, the cam mechanism includes a cylinder 42 formed by complementary halves 42A and 42B which has a series of continuous cam tracks formed thereon, some of which are zig-zag and other of which are linear, depending on the robot program. As shown in the cam layout in FIG. 9 for the programs I, II, III and IV, there are a total of twelve cam tracks (four sets), which selectively cooperate with three cam followers (36B, 38B and 37B).

Program I is effective when the followers simultaneously engage the set constituted by right track $P'_R$, center track $P'_C$ and left track $P'_L$, program II is in effect when tracks $P^2_R$, $P^2_C$ and $P^2_L$ in the second set are engaged, program III when tracks $P^3_R$, $P^3_C$ and $P^3_L$ in the third set are engaged, and program 14 when tracks $P^4_R$, $P^4_C$ and $P^4_L$ in the fourth set are engaged.

Cam cylinder 42 is supported for rotation on a cam shaft 43 which is journaled on the end walls of a cam and drive carrier 44, one end of this shaft having a drive gear 45 keyed thereto. Drive gear 45 is operated through an intermediate spur gear 46 whose pinion engages the worm gear 47 on the shaft of an electric motor 48. The motor is operated by batteries 49 under the control of switch 17 (FIG. 1). The drive mechanism for the cam cylinder is supported on the carrier.

Carrier 44 is supported within pedestal 12 by means of an overhead beam 50 so that one may shift the position of the cam cylinder with respect to the cam followers. This is done by means of selector tab 18 which is attached to the carrier. Thus by shifting the carrier so that it occupies any one of the four positions established by the notches 19 in the front wall of the pedestal (FIG. 1), the cam followers are caused to engage a selected one of the four sets of program tracks.

Robot Operation:

In program I which is the one in which the torso element is caused to rock from side to side, it will be seen in FIG. 9, that right track $P'_R$ which is engaged by the rightrocker linkage 37 for rack 25 is straight, whereas center track $P'_C$ engaged by the center rocker linkage 38 which controls strings 30 and 31 is zig-zag in form and that the left track $P'_L$ engaged by the left-rocker linkage 37 is straight. Hence the racks in program I, because of the straight tracks do not move, whereas the rocker plate which is string-operated is caused by the zig-zag track $P'_C$ to cause the torso to bend or rock from side to side.

In program II which is the one in which bowing takes place, right track $P^2_R$ is zig-zag in form, center track $P^2_C$ is straight, while left track $P^2_L$ has a zig-zag formation which is the mirror image of the right track formation so that the racks 24 and 25 move concurrently in the same directions to cause, for each rotation of the cam cylinder, a front bend or bowing movement which is repeated as a cylinder continues to turn.

In program III in which twisting occurs, right track $P^3_R$ has a zig-zag formation which is the same as that of left track $P^3_L$, whereas center track $P^3_C$ is straight, as a result of which racks 24 and 25 reciprocate concurrently in phase opposition, causing the torso to oscillate back and forth.

Program IV in which front bending or bowing and twisting occur at the same time so that the movement is vector resultant thereof, is one in which the right track $P^4_R$ and left track $P^4_L$ have a formation which is a composite of the corresponding track formations in programs II and III, the center track $P^4_C$ being straight so that no rocking takes place.

It is to be understood that these track formations and the number of tracks on the cam cylinder in the embodiment shown, represent but one of many possible formations and that it is feasible using the principles underlying the invention to produce a robot capable of executing different and more complex calisthenic movements including leg and head movements. Where the legs are not stiff as shown but are articulated and movable, then instead of racks, the spur gears are coupled to the rocker linkages by means of cable and pulling arrangements of the type used for example in dental drills to transmit rotary power.

While there have been shown and described preferred embodiments of a physical training robot in accordance with the invention, it will be appreciated that many changes and modifications may be made therein without, however, departing from the essential spirit thereof.

I claim:

1. A physical training robot arrangement adapted to demonstrate any one of a series of calisthenic movements, said arrangement comprising:
   A. a robot having a humanoid form including a torso element having hand and arm assemblies attached to the shoulders thereof, said torso element being mounted above a pelvis element and being rockable from side to side and being oscillatable back and forth with respect to said torso element, said pelvis element being trunnioned on top of a pair of legs whereby the pelvis element may be caused to bend forwardly to execute a bowing movement of the robot; and
   B. a motorized mechanism operatively coupled to said torso and pelvis elements selectively to effect rocking, oscillating and bowing movements thereof.

2. An arrangement as set forth in claim 1, wherein said mechanism is also adapted to effect a concurrent combination of at least two of said movements.

3. An arrangement as set forth in claim 1, wherein said assemblies are articulated and are pivoted to said shoulders whereby the hands and arms may be manually adjusted to assume any desired posture.

4. An arrangement as set forth in claim 1, wherein said legs are anchored on a pedestal housing said motorized mechanism.

5. An arrangement as set forth in claim 1, wherein said mechanism includes a cam cylinder having a plurality of caam track sets, each set being engaged by cam followers operatively coupled to said torso and pelvis elements, and selector means to bring said followers into engagement with a desired track set.

6. An arrangement as set forth in claim 5, wherein said oscillating and bowing movement is effected by means including a pair of spur gears engaging opposite sides of a crown gear, and a pair of reciprocatable racks engaging said spur gears under the control of respective cam followers whereby when the spur gears are caused to move in opposite directions, said crown gear rotates back and forth to produce said oscillating movement, and when said spur gears are both caused to move in the same direction, said crown gear is locked thereby to produce said bowing movement.

7. An arrangment as set forth in claim 5, wherein said cylinder is supported within a longitudinally-movable carrier which is shiftable by said selector means.

8. An arrangement as set forth in claim 5, further including a rocker plate disposed in said torso element and connected by strings to a respective cam follower to effect a rocking action.

9. A robot having a humanoid form and comprising:
   A. a torso element having shoulders and having a head piece attached thereto;
   B. left and right articulated hand and arm assemblies pivotally attached to said shoulders;
   C. a pelvis element disposed below said torso element, said torso element being coupled to said pelvis element and being rockable from side to side and being oscillatable back and forth relative to said pelvis element; and
   D. a pair of legs having haunches coupled to said pelvis element whereby said pelvis element is swingable relative to said legs to produce a bowing movement.

* * * * *